US008418712B2

(12) United States Patent
Cai et al.

(10) Patent No.: US 8,418,712 B2
(45) Date of Patent: Apr. 16, 2013

(54) AIR DISCHARGE IMPLEMENT FOR A PORTABLE PRESSURIZED SPRAYER

(76) Inventors: Ying Lin Cai, Guangdong (CN); Chao Fou Hsu, Kaohsiung (CN)

( * ) Notice: Subject to any disclaimer, the term of this patent is extended or adjusted under 35 U.S.C. 154(b) by 424 days.

(21) Appl. No.: 12/872,815

(22) Filed: Aug. 31, 2010

(65) Prior Publication Data

US 2011/0061746 A1 Mar. 17, 2011

Related U.S. Application Data

(60) Provisional application No. 61/241,989, filed on Sep. 14, 2009.

(51) Int. Cl.

| | |
|---|---|
| ***F24D 19/08*** | (2006.01) |
| ***F16K 24/04*** | (2006.01) |
| ***F16K 21/18*** | (2006.01) |
| ***F16K 31/20*** | (2006.01) |
| ***A62C 13/62*** | (2006.01) |

(52) U.S. Cl.

USPC ........... 137/197; 137/199; 137/517; 239/372; 239/398; 239/411; 251/24; 251/30.05

(58) Field of Classification Search .................. 239/372, 239/398, 410, 411, 413, 416.2; 251/24, 30.03, 251/30.04, 30.05; 137/455, 469, 470, 513.3, 137/115.11, 502, 197, 199, 517

See application file for complete search history.

(56) References Cited

U.S. PATENT DOCUMENTS

| | | | | |
|---|---|---|---|---|
| 2,054,093 | A * | 9/1936 | Mills | 99/474 |
| 4,759,476 | A * | 7/1988 | Pasbrig | 222/482 |
| 5,040,576 | A * | 8/1991 | Faeth | 141/45 |
| 5,303,866 | A | 4/1994 | Hawks, Jr. | |
| 6,026,845 | A * | 2/2000 | Walrath et al. | 137/360 |
| 7,118,050 | B1 | 10/2006 | Chen | |
| 2006/0027680 | A1 | 2/2006 | Wu | |

* cited by examiner

*Primary Examiner* — Len Tran
*Assistant Examiner* — Justin Jonaitis
(74) *Attorney, Agent, or Firm* — Bacon & Thomas, PLLC

(57) ABSTRACT

The present invention provides an air discharge implement for a portable pressurized sprayer comprising a cylindrical main body of discharging duct, an external hood jacket, a conical moving plug and a compression spring. Wherein the main body of hollow discharging duct includes a cylinder bore, a cylindrical discharging mount for containing conical moving plug, and an air passage interposed between hollow discharge chamber and cylinder bore. The external hood jacket is a hollow holder to contain compression spring. The conical moving plug includes a top cone and a planar base with plural footing legs so that a water flow gap is created between the planar base and the air passage at the cylinder bore. If the present invention is properly connected to a water outtake hose of a portable pressurized sprayer, either no air or certain air mingled in the compressed water, it can achieve the air-discharging effect completely.

9 Claims, 16 Drawing Sheets

AIR DISCHARGE IMPLEMENT FOR A PORTABLE PRESSURIZED SPRAYER

This application claims the benefit of provisional U.S. Patent Application No. 61/241,989, filed Sep. 14, 2009.

FIELD OF THE PRESENT INVENTION

The present invention relates to an "air discharge implement for a portable pressurized sprayer", particularly for one that can be universally interposed in the water outtake hose of any existing portable pressurized sprayer so that the long-standing issue for air mingled in the compressed water can be completely solved and obviated with result in avoiding overall interrupted and unstable water pressure output of the portable pressurized sprayer.

BACKGROUND OF THE INVENTION

Currently, for the conventional "portable pressurized sprayers" disclosed such as US patent issued numbers U.S. Pat. Nos. 7,118,050 and 5,303,866 as well as Taiwan patent issued number 1253421, every structure for these foregoing conventional "portable pressurized sprayers" are almost similar. Referring to FIGS. 1 through 3, typical conventional portable pressurized sprayer comprises a water sprayer 1, a portable reservoir 2, a rechargeable battery 3 and a diaphragm compression pump 10, wherein said water sprayer 1 is a nozzle for spurting clean water out for cleaning target object, which is supplied from the portable reservoir 2 via a water intake hose 4, the diaphragm compression pump 10 and a water outtake hose 5; said portable reservoir 2, which colloquially called water tank, usually comprises a water replenish spout 21 on the top thereof for being supplied water, and a recessed planar base 22 with cross section in L-shape and consists of a horizontal planar bottom and a vertical right angle tucked buttress for conveniently accommodating the rechargeable battery 3 and a diaphragm compression pump 10 such that a water outlet 20 is disposed on the vertical tucked buttress of the recessed planar base 22; said rechargeable battery 3, which is 24 VDC for powering the diaphragm compression pump 10, can be recharged by means of a cigar-lighter power receptacle of automobile; and said diaphragm compression pump 10, which compresses and drive water from the portable reservoir 2 to the water sprayer 1 via the water intake hose 4, includes a water inlet 11 connected to the water intake hose 4 and a water outlet 12 connected to the water sprayer 1. Accordingly, the appealing function of the conventional portable pressurized sprayer is to breakthrough the confinement of the water supply so that it can be brought to outdoor anywhere to perform cleaning job as long as the portable reservoir 2 is beforehand fed sufficient water W via water replenish spout 21 (as shown in FIG. 2). Once the conventional portable pressurized sprayer is brought to the cleaning job site, upon power being turning on for activating the diaphragm compression pump 10, the water W in the portable reservoir 2 is sucked into the diaphragm compression pump 10 for being compressed into compressed water W' orderly via water outlet 20 of the portable reservoir 2, water intake hose 4 and water inlet 11 of the diaphragm compression pump 10; Then, the compressed water W' is expelled out to the water sprayer 1 for cleaning job orderly via water outlet 12 of the diaphragm compression pump 10 and the water outtake hose 5 (as shown in FIG. 3).

However, a drawback of "air residual in the water intake hose 4" exists in the foregoing operation of conventional portable pressurized sprayer that when the portable reservoir

2 is replenished with new sufficient water W if all the stored water W in the portable reservoir 2 has been used up. Because the water intake hose 4 directs the water W from the water outlet 20 of the portable reservoir 2 to the water inlet 11 of the diaphragm compression pump 10, the air residual in the water intake hose 4 will be mingled with water W and flowed into the diaphragm compression pump 10. The air residual, which is flowed into the diaphragm compression pump 10, becomes an improper load for all parts of the diaphragm compression pump 10 with malignant result not only harmfully affecting the stable compression but also incurring malfunction due to intermittently and unstably harsh impact on the output water pressure of the water outlet 12. Thereby, the service life of the diaphragm compression pump 10 will be shortened because the air residual therein as an improper load for all parts thereof.

Hence, having addressed to the issue of how to eliminating the foregoing "air residual in the water intake hose 4" during every replenishing water into the portable reservoir 2, the inventor of the present invention has actively undertaken research and development for a long time in experimental test. Eventually, an innovative solution is successfully worked out, and submitted a patent application in Taiwan with register number of 096142614 (publicized number of 200912139). Referring to FIGS. 4 and 5, the specific structure for the foregoing patent application to the China Patent Office comprises a cylindrical discharging mount 30 and a pneumatic hollow plunger 40, wherein said cylindrical discharging mount 30, which is a hollow cylinder, has a first cylindrical discharging chamber 31 and a second cylindrical discharging chamber 32 disposed in the lower section and upper section thereof in fluid communicable to each other such that the inner diameter of the first cylindrical discharging chamber 31 is bigger than that of the second cylindrical discharging chamber 32, a discharging vent 34 disposed in the central top thereof in facing towards the second cylindrical discharging chamber 32, and an air passage 33 disposed in the bottom wall thereof such that the first cylindrical discharging chamber 31 is fluid communicable with the water outlet 12 of the diaphragm compression pump 10; and said pneumatic hollow plunger 40, which is a bucket-like hollow piston, includes a top opening end 41, a bottom flanged hatch end 42, a backing compression spring 43, a side vent 44 and a sealing O-ring 45 of water-tight, wherein the opening end 41 is fittingly contained in the second cylindrical discharging chamber 32 in sliding manner while the flanged hatch end 42 is properly contained in the first cylindrical discharging chamber 31 in sliding manner with flange planar base thereof facing to the air passage 33 of the cylindrical discharging mount 30, the compression spring 43 is snugly inserted in the pneumatic hollow plunger 40 in facing to the opening end 41, the side vent 44 is created at the side wall of the pneumatic hollow plunger 40 near to the flanged hatch end 42 such that it is blocked if the pneumatic hollow plunger 40 is pushed backwardly all the way while it is able to pass fluid in the first cylindrical discharging chamber 31 if the pneumatic hollow plunger 40 is pushed forwardly all the way and the sealing O-ring 45 is placed around the peripheral of the pneumatic hollow plunger 40 in contact with the top rim of the flanged hatch end 42 (as shown in enlarged view of FIG. 5).

The operation modes for the foregoing patent application are demonstrated in FIGS. 6 and 7. In normal mode of no air A mingled in the compressed water W', the pressure of the compressed water W' in the water outlet 12 of the diaphragm compression pump 10 is higher than the resilient force of the compression spring 43 so that the flanged hatch end 42 of the pneumatic hollow plunger 40 is acted and pushed backwardly all the way by the pressure of the compressed water W' at the air passage 33 of the cylindrical discharging mount 30, certain partial compressed water W' in the water outlet 12 will flow into the first cylindrical discharging chamber 31 via air passage 33 and the pneumatic hollow plunger 40 will be pushed into the second cylindrical discharging chamber 32 all the way until the sealing O-ring 45 on the flanged hatch end 42 closely contact with distal inner end wall of the first cylindrical discharging chamber 31 in water-tight manner so that no compressed water W' in the first cylindrical discharging chamber 31 can flow into the second cylindrical discharging chamber 32 and no more compressed water W' in the water outlet 12 can further flow into the first cylindrical discharging chamber 31 via air passage 33. Thus, all the following compressed water W' will normally flow out via water outlet 12 for proper purpose (as shown in solid line indicating arrowhead in FIG. 6). In abnormal mode with air A mingled in the compressed water W', the pressure of the compressed water W' in the water outlet 12 of the diaphragm compression pump 10 is lower than the resilient force of the compression spring 43 so that the flanged hatch end 42 of the pneumatic hollow plunger 40 is acted and pushed forwardly all the way by the resilient force of the compression spring 43 until the corrugated flange planar base of the flanged hatch end 42 contacts with proximal inner end wall of the first cylindrical discharging chamber 31 so that the side vent 44 at the side wall of the pneumatic hollow plunger 40 is moved in the first cylindrical discharging chamber 31 and able to pass fluid. Accordingly, the air A mingled in the compressed water W' firstly will pass the corrugated flange planar base of the flanged hatch end 42 via the air passage 33 then flow into the first cylindrical discharging chamber 31; Secondly, the air A mingled in the compressed water W' will flow into the pneumatic hollow plunger 40 via the side vent 44 now moved in the first cylindrical discharging chamber 31; And finally, the air A mingled in the compressed water W' will be discharged out the diaphragm compression pump 10 orderly via the opening end 41 of the pneumatic hollow plunger 40 and the discharging vent 34 of he cylindrical discharging mount 30 to achieve the discharging effect for the air A mingled in the compressed water W' (as shown in dashed line indicating arrowhead in FIG. 7). After all the air A mingled in the compressed water W' have been discharged out of the diaphragm compression pump 10, the operation status is resumed to normal mode of no air A mingled in the compressed water W' so that the pneumatic hollow plunger 40 in the cylindrical discharging mount 30 is again forced and pushed backwardly into the second cylindrical discharging chamber 32 as normal compression and discharging position (as shown in FIG. 6) to allow the diaphragm compression pump 10 being resumed to normal compression and discharging operation.

After mass production via molding process for the foregoing patent application in Taiwan with register number of 096142614, the discharging effect for the air A mingled in the compressed water W' has been tested to achieve the expected efficiency satisfactorily. However, another drawback is found in the experimental test with circumstance as shown in FIG. 8. Before starting operation of the diaphragm compression pump 10, the flanged hatch end 42 of the pneumatic hollow plunger 40 will completely block the air passage 33 of the cylindrical discharging mount 30 under the resilience of the backing compression spring 43. At this moment, if any residual air A exists in the water intake hose 4, the compressed water W' in the water outlet 12 will be mingled with certain air A to reduce the water pressure thereof when the diaphragm compression pump 10 is started so that the water pressure of the compressed water W' is kept in less than the resilience of the backing compression spring 43. Thereby, the air A mingled in the compressed water W' can never be smoothly discharged because the flanged hatch end 42 of the pneumatic hollow plunger 40 will be remained in completely blocking the air passage 33 of the cylindrical discharging mount 30 under the resilience of the backing compression spring 43 (as the hypothetical arrow heads shown at the air passage 33 in FIG. 8.). If this circumstance can not be remedied, it will become a new issue of the portable pressurized sprayer with malignant result in harmfully affecting efficiency of air discharging action therein. Accordingly, the inventor of the present invention must address to the new issue and contrive a further and thorough solution by the present invention.

SUMMARY OF THE INVENTION

The primary object of the present invention is to provide an "air discharge implement for a portable pressurized sprayer" comprising a cylindrical main body of discharging duct, an external hood jacket, a conical moving plug and a compression spring, wherein said main body of discharging duct, which is an hollow tube, includes a cylinder bore, a cylindrical discharging mount disposed at the wall thereof for containing the conical moving plug, and an air passage just interposed between the hollow discharge chamber and cylinder bore; said external hood jacket is an inverted hollow bucket-shaped holder not only to envelope over the cylindrical discharging mount in the main body of discharging duct but also to contain the compression spring therein; and said conical moving plug includes a top cone and a planar base with plural footing legs of equivalent length so that a water flow gap with height equivalent to height of the footing leg is created between the planar base of the conical moving plug and the air passage at the cylinder bore in the main body of discharging duct. Let the "air discharge implement for a portable pressurized sprayer" of the present invention is properly connected to the water outtake hose of the portable pressurized sprayer with happening condition that certain air mingled in the compressed water with result in overall water pressure being less than the resilience of the compression spring, even at this moment, if the diaphragm compression pump is started, the present invention still has air-discharging ability to achieve expected effect. Therefore, either no air or certain air mingled in the compressed water, the present invention can achieve the air-discharging effect completely.

It is simple and easy to install the "air discharge implement for a portable pressurized sprayer" of the present invention on the existing portable pressurized sprayer that cut an existing water outtake hose of portable pressurized sprayer at any suitable position into two separated pieces and insert each opening end for the cylinder bore in the main body of discharging duct into each corresponding end of each separated water outtake hose respectively. The other object of the present invention is to provide an "air discharge implement for a portable pressurized sprayer" featuring a simple and easy connecting means to install it on the existing portable pressurized sprayer as mentioned above so that any currently existing portable pressurized sprayer without air-discharging device can compatibly use it without any extra cost to purchase a new one with air-discharging device to replace the old one. Thus, the consumer can solve the air-discharging issue at minimal cost relatively.

DETAILED DESCRIPTION OF THE PREFERRED EMBODIMENTS

Figure 1:
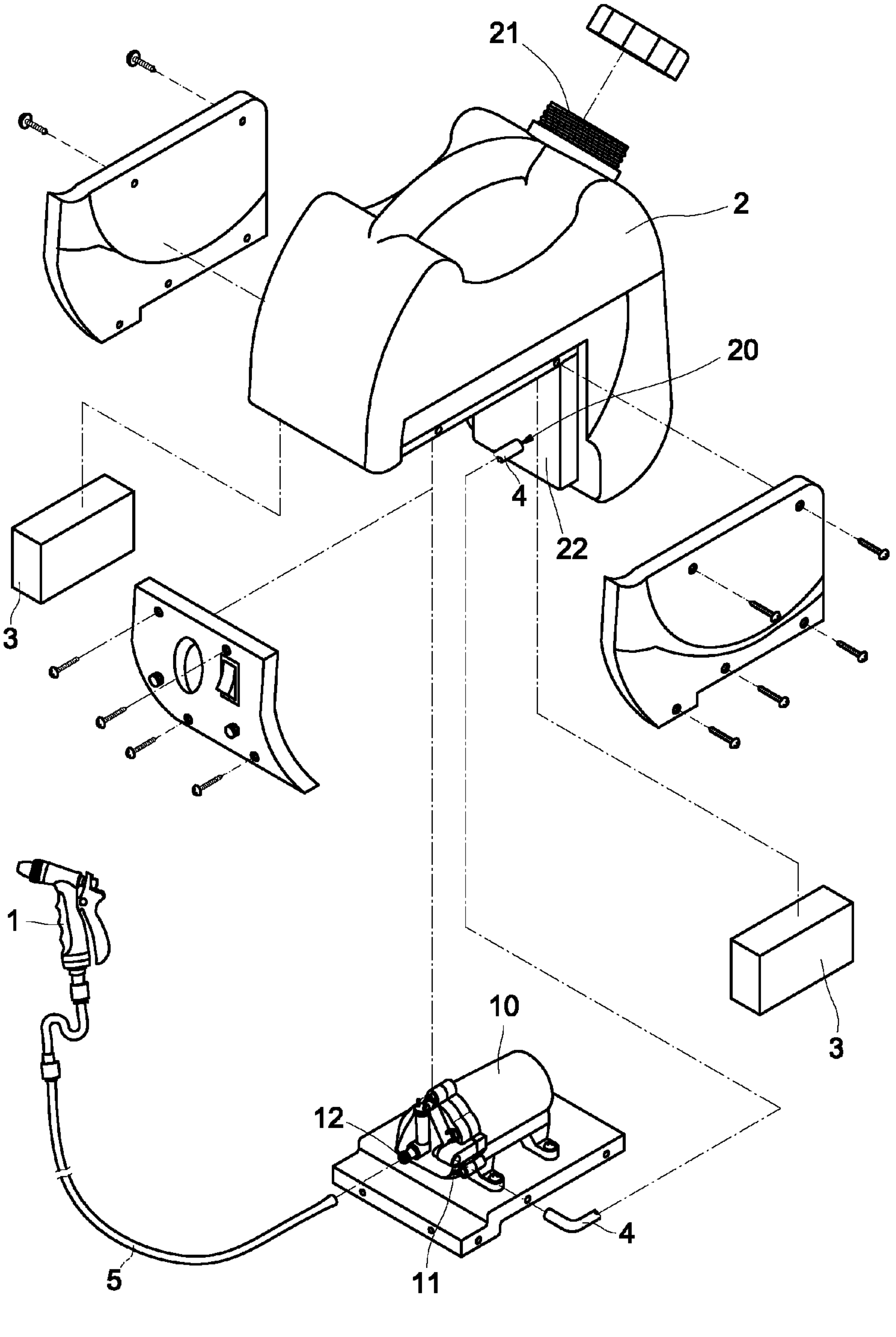
FIG.1 (PRIOR ART)
FIG. 1 is an exploded perspective view for a conventional portable pressurized sprayer.
Figure 2:
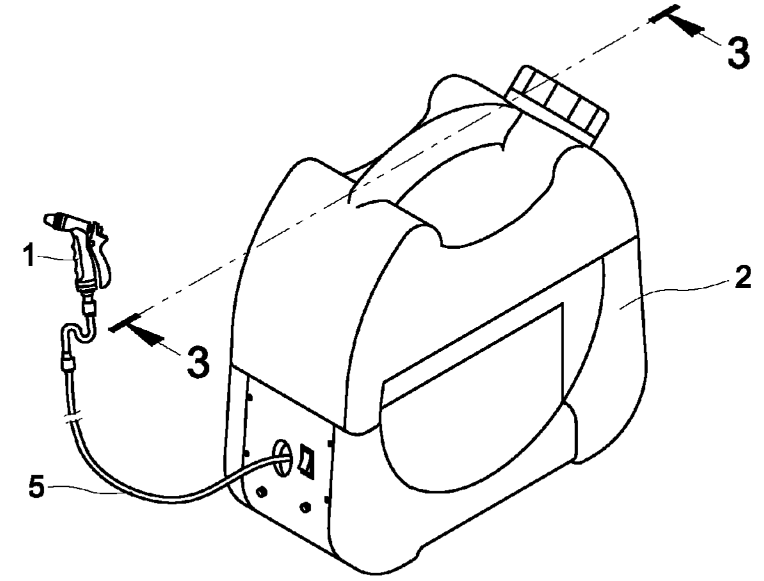
FIG.2 (PRIOR ART)
FIG. 2 is an assembly perspective view for a conventional portable pressurized sprayer.
Figure 3:
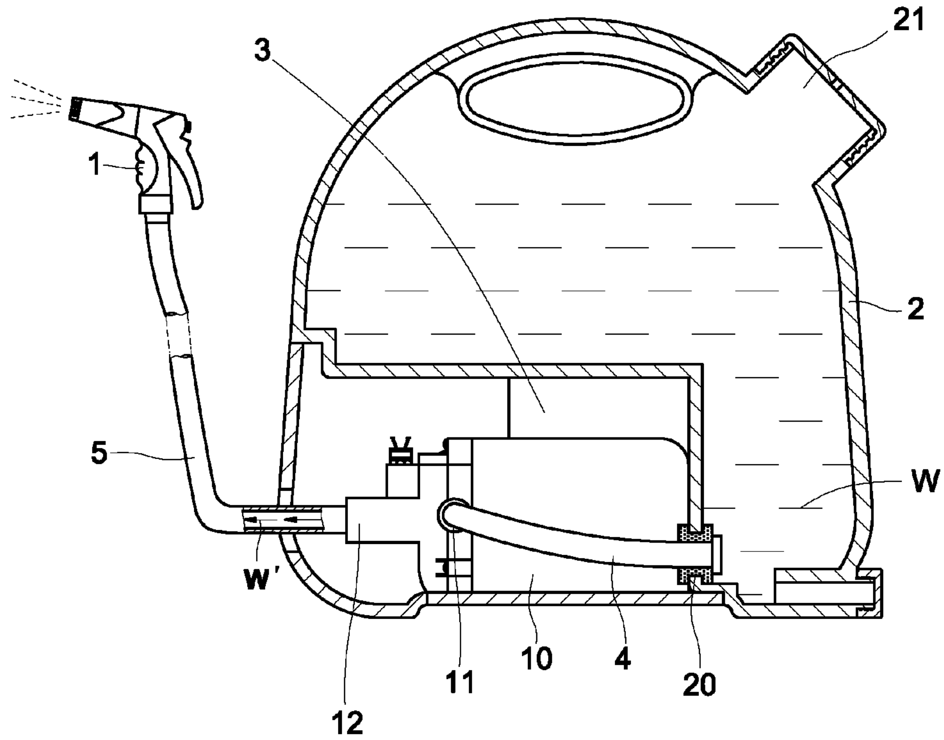
FIG.3 (PRIOR ART)
FIG. 3 is a sectional view taken along the line 3-3 of the FIG. 2.
Figure 4:
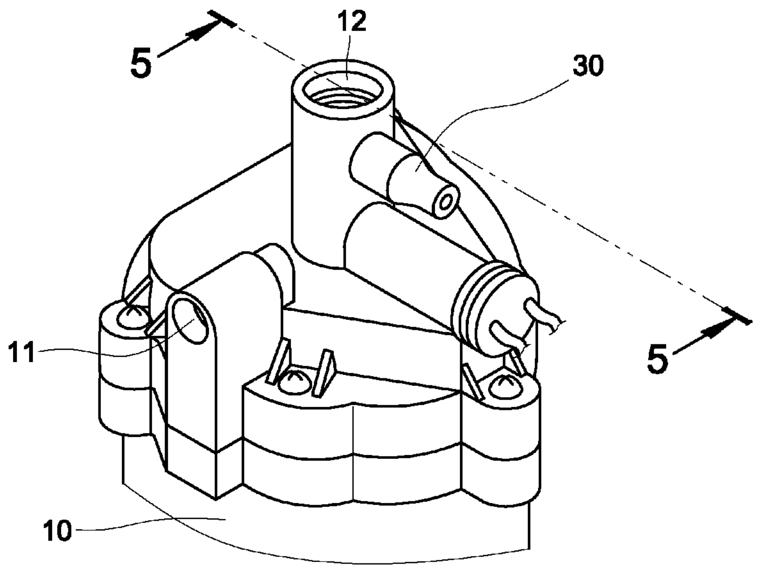
FIG.4 (PRIOR ART)
FIG. 4 is a partial perspective view showing a diaphragm compression pump for a conventional portable pressurized sprayer.
Figure 5:
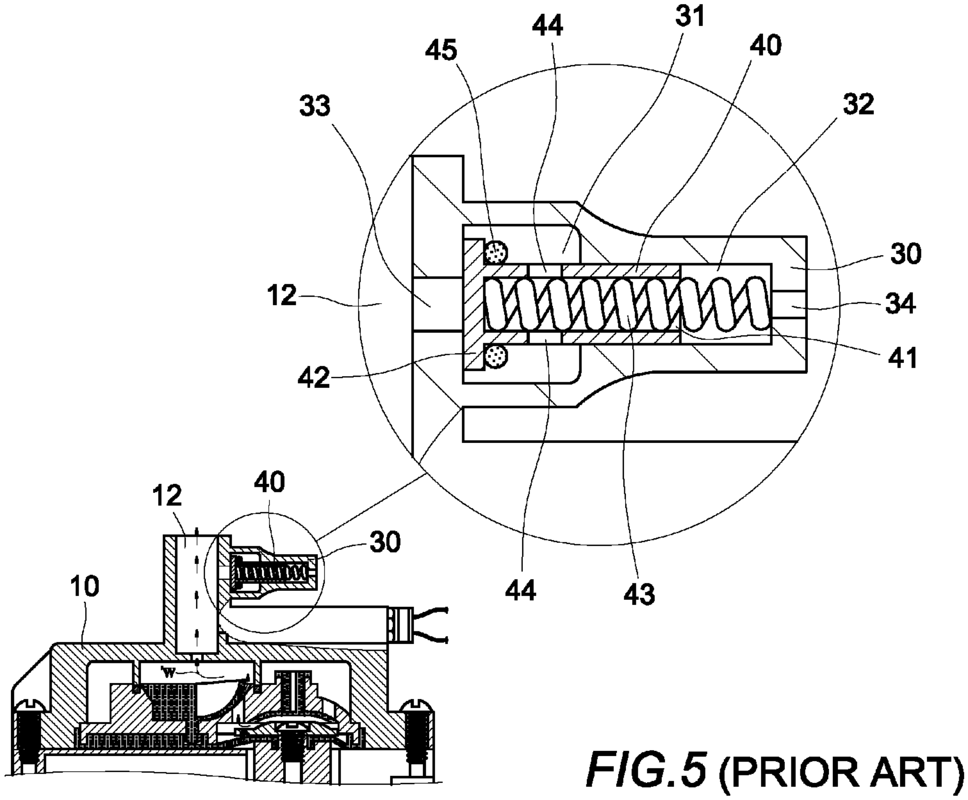
FIG.5 (PRIOR ART)
FIG. 5 is a sectional view taken along the line 5-5 of the FIG. 4.
Figure 6:
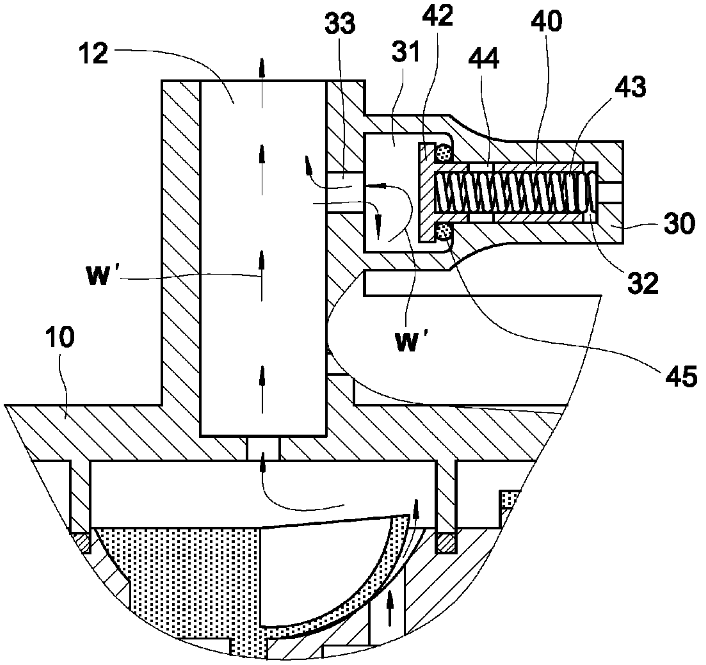
FIG.6 (PRIOR ART)
FIG. 6 is the first operational schematic view showing an air discharging action in a diaphragm compression pump for a conventional portable pressurized sprayer.
Figure 7:
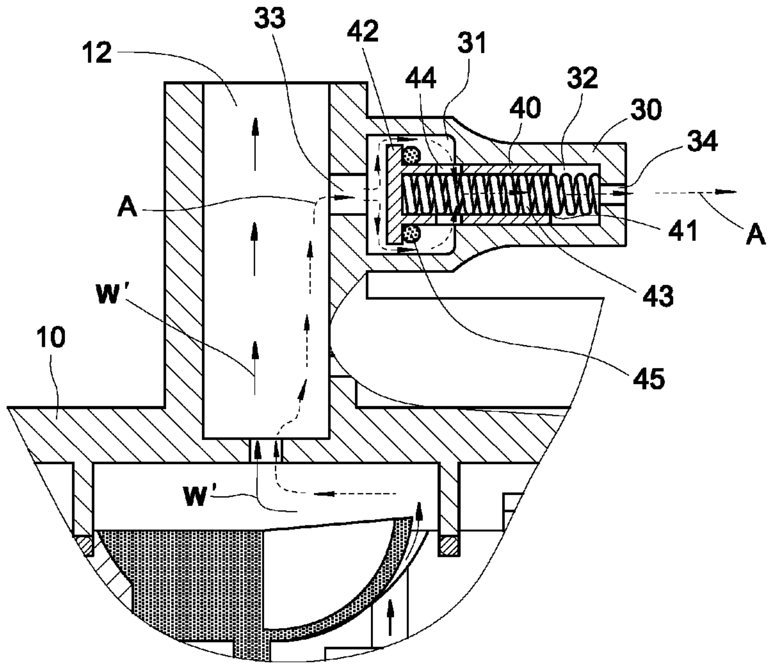
FIG.7 (PRIOR ART)
FIG. 7 is the second operational schematic view showing an air discharging action in a diaphragm compression pump for a conventional portable pressurized sprayer.
Figure 8:
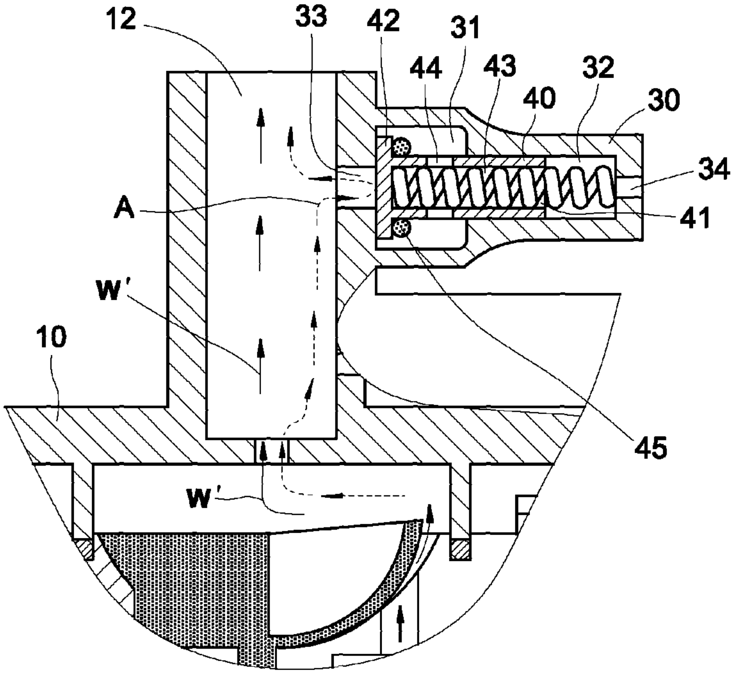
FIG.8 (PRIOR ART)
FIG. 8 is the third operational schematic view showing an air discharging action in a diaphragm compression pump for a conventional portable pressurized sprayer.

As shown in FIGS. 9 through 13, an "air discharge implement for a portable pressurized sprayer" for the first exemplary preferred embodiment of the present invention comprises a cylindrical main body 50, an external hood jacket 60, a conical moving plug 90 and a compression spring 80, wherein:

Said main body 50, which is a hollow tube made by unitary injection molding method with outer diameter approximately equaling bore for a water outtake hose 5 of a portable pressurized sprayer, includes a cylinder bore 51 for compressed water W' flow therein, a cylindrical discharging mount 52 with a male external thread 53 vertically disposed on the wall thereof, a central internal hollow discharge chamber 54 with a bottom side 55 of solid ring, and an air passage 56 just interposed between the hollow discharge chamber 54 and cylinder bore 51 to make both of which mutually become water communicable each other;

Said external hood jacket 60, which is an inverted hollow bucket-shaped holder to envelope over the cylindrical discharging mount 52 of the main body 50, orderly includes a discharging vent 61, an airflow passage 62, a intake chamber 63 with an upper side of solid ring and a female internal thread 64 from top to bottom in the central inner portion thereof such that the discharging vent 61 and airflow passage 62 as well as the airflow passage 62 and intake chamber 63 are mutually fluid communicable respectively, and bore of the intake chamber 63 is bigger than that of the airflow passage 62 while bore of the airflow passage 62 is bigger than that of the discharging vent 61;

Said conical moving plug 90, which is made of soft elastic material to be perched in the hollow discharge chamber 54 of the main body 50, includes a top cone 92 and a planar base 91 with plural footing legs 93 of equivalent length; and Said compression spring 80, which is inserted in the airflow passage 62 of the external hood jacket 60, is configured with bottom thereof contacting against the top cone 92 in the conical moving plug 90 such that inner diameter thereof less than outer diameter of the top cone 92 in the conical moving plug 90.

Figure 10:
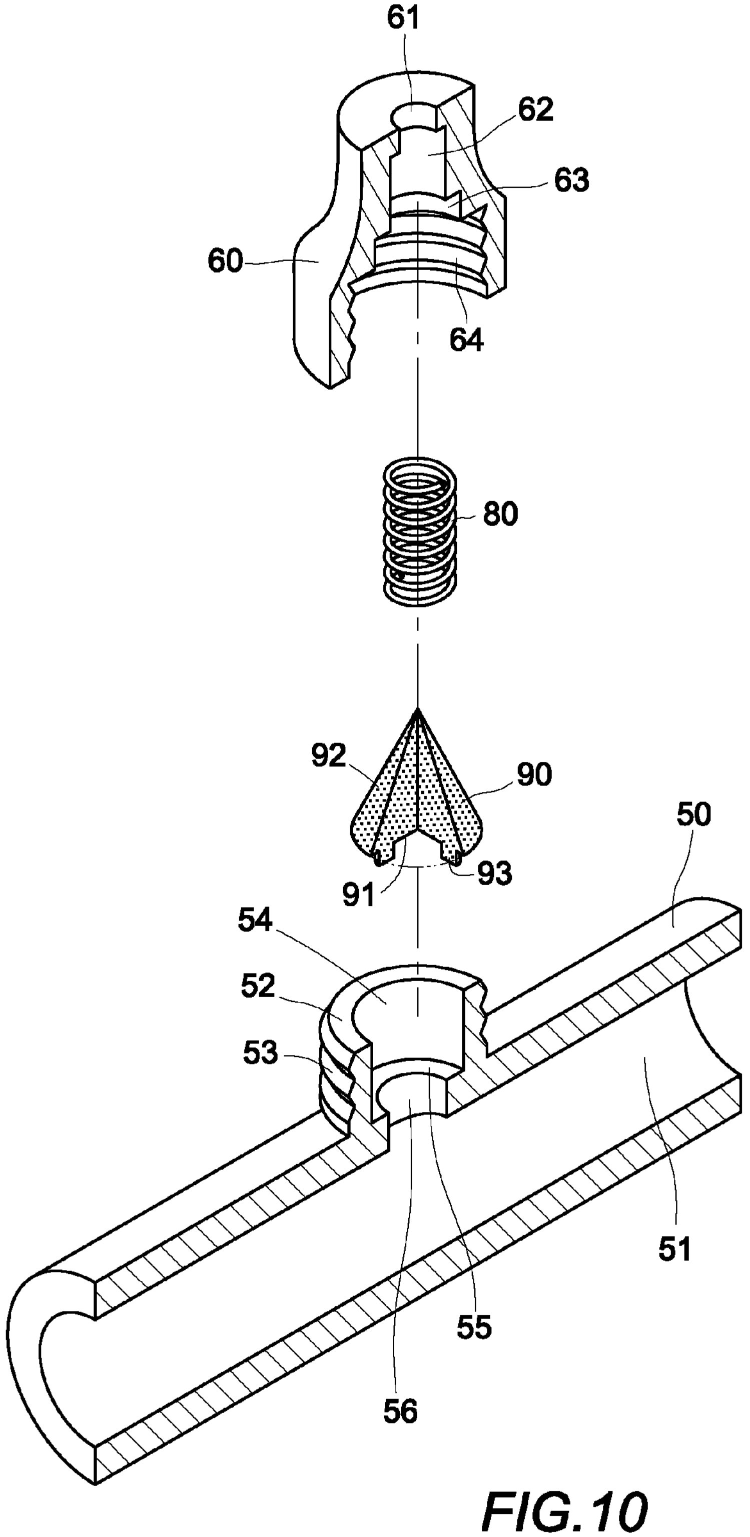
FIG. 10 is an exploded perspective view in cross section manner according to the first preferred embodiment of the present invention.
Figure 11:
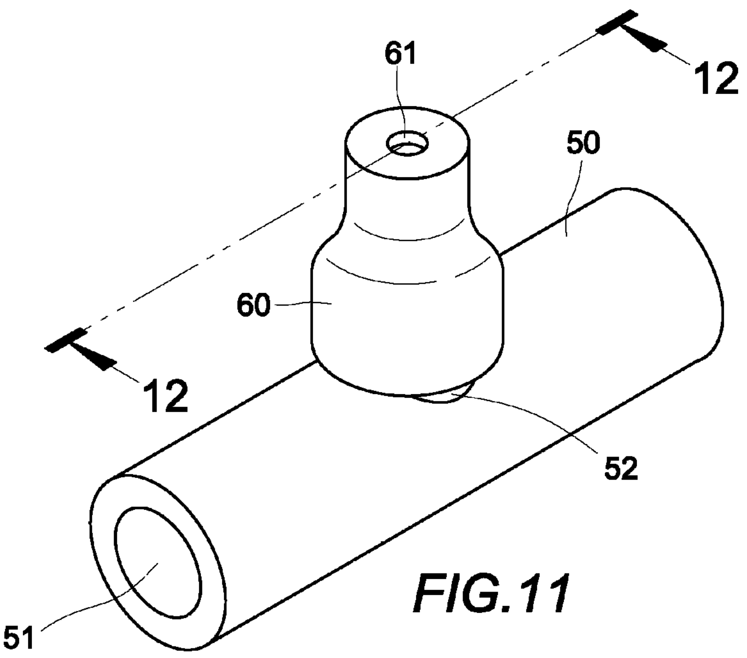
FIG. 11 is an assembly perspective view according to the first preferred embodiment of the present invention.
Figure 12:
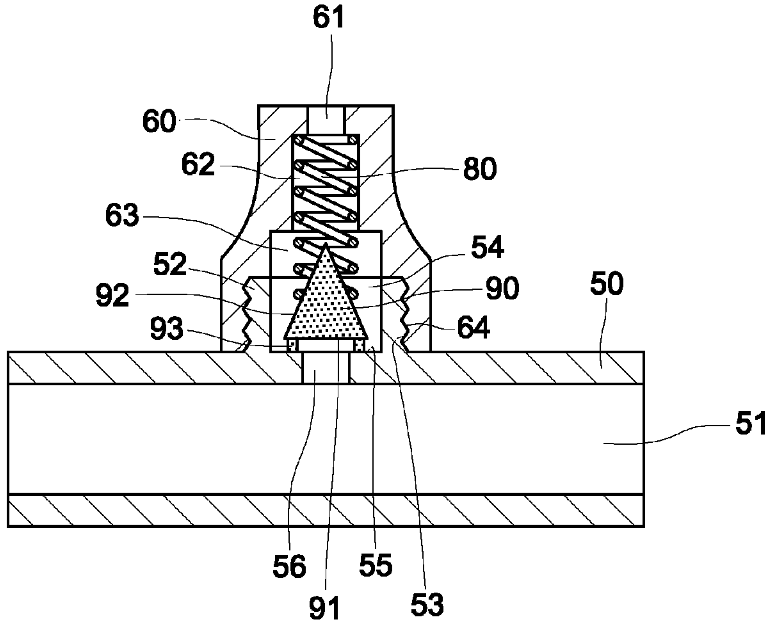
FIG. 12 is a sectional view taken along the line 12-12 of the FIG. 11.

As shown in FIGS. 10 through 12, the assembling procedure of the "air discharge implement for a portable pressurized sprayer" for the first exemplary preferred embodiment of the present invention is very simple and easy. Firstly, align the planar base 91 of the conical moving plug 90 with the cylindrical discharging mount 52 of the main body 50 to put the moving plug 90 into the hollow discharge chamber 54 of the cylindrical discharging mount 52 such that the footing legs 93 of the moving plug 90 closely attach on the bottom side 55 of the hollow discharge chamber 54 in firm manner; Secondly, insert the compression spring 80 into the airflow passage 62 of the external hood jacket 60 such that the last coil at the bottommost thereof securely attach against the top cone 92 of the conical moving plug 90; and Finally, slightly cover the external hood jacket 60 over the cylindrical discharging mount 52 of the main body 50, then screw the female internal thread 64 therein to engage with the male external thread 53 on the cylindrical discharging mount 52 to finish the assembling procedure (as shown in FIGS. 11 and 12). Thereby, a water flow gap with height equivalent to height of the footing leg 93 is created between the planar base 91 of the conical moving plug 90 and the air passage 56 at the cylinder bore 51 of the main body 50 (as shown in FIG. 12).

Figure 9:
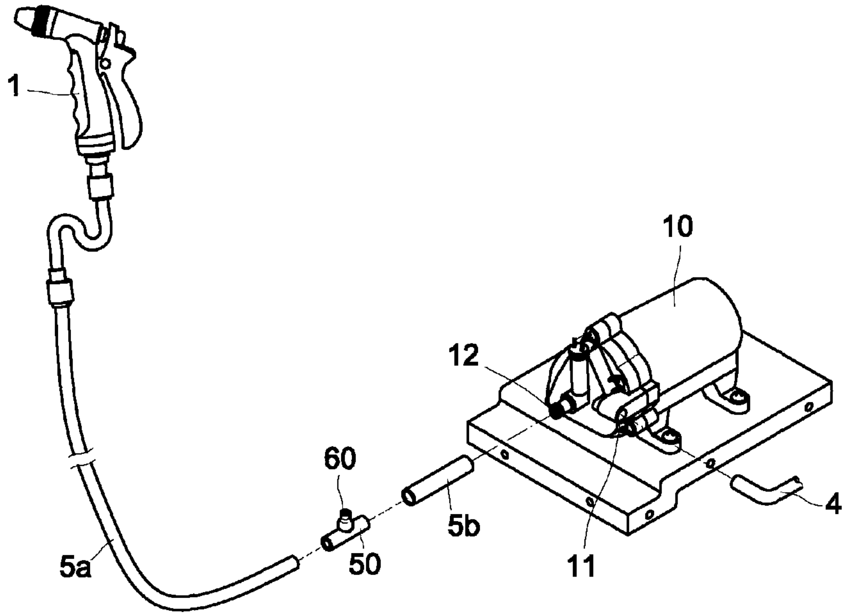
FIG. 9 is a perspective schematic view showing an air discharge implement installed on a portable pressurized sprayer of the present invention.
Figure 13:
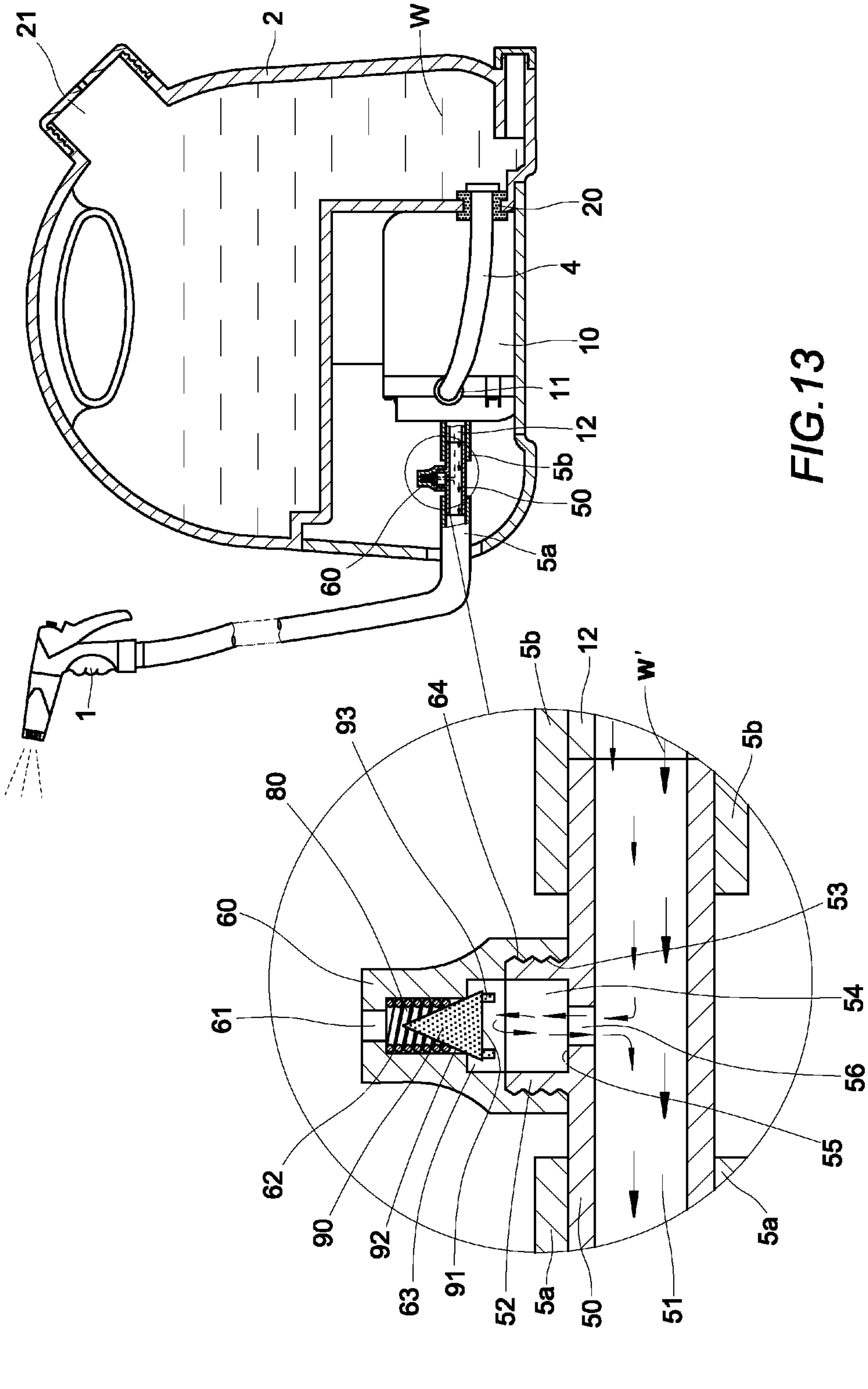
FIG. 13 is the first operational schematic view in cross section manner according to the first preferred embodiment of the present invention.

The installation, application and operation of the "air discharge implement for a portable pressurized sprayer" for the first exemplary preferred embodiment of the present invention is illustrated as shown in FIGS. 9 and 12 through 15. Firstly, cut the water outtake hose 5 at any suitable position into a water outtake hose 5*a* piece and another water outtake hose 5*b* piece (as shown in FIG. 9); and secondly, insert each opening end for the cylinder bore 51 of the main body 50 into each corresponding end of the water outtake hose 5*a* and water outtake hose 5*b* respectively to finish the installation of the "air discharge implement for a portable pressurized sprayer" on a portable pressurized sprayer (as shown in FIG. 13). In normal mode of no air A mingled in the compressed water W', the pressure of the compressed water W' in the water outlet 12 of the diaphragm compression pump 10 is higher than the resilient force of the compression spring 80 such that the compressed water W' come from the water outlet 12 of the diaphragm compression pump 10 via the water outtake hose 5*b* will flow into the hollow discharge chamber 54 in the cylindrical discharging mount 52 via the air passage 56 at the cylinder bore 51 of the main body 50, where the conical moving plug 90 is upwardly pushed by the compressed water W' in overcoming the resilient force of the compression spring 80 to have its top cone 92 thoroughly plunged into the airflow passage 62 of the external hood jacket 60 and hermetically attached on the upper side of solid ring at the intake chamber 63 in water tight manner because the soft elastic material feature of the moving plug 90 can contact with the rigid material feature of the external hood jacket 60 in interference manner with leak-resistant effect; Thereby, all the compressed water W' in the hollow discharge chamber 54 is unable to flow into the airflow passage 62 of the external hood jacket 60, and forced to circulate into a water sprayer 1 orderly via the cylinder bore 51 of the main body 50 and the water outtake hose 5*a* (as shown in FIG. 13 and solid arrows of enlarged view shown in FIG. 13). This operation mode reflects the normal condition of the diaphragm compression pump 10 and the portable pressurized sprayer 1.

Figure 14:
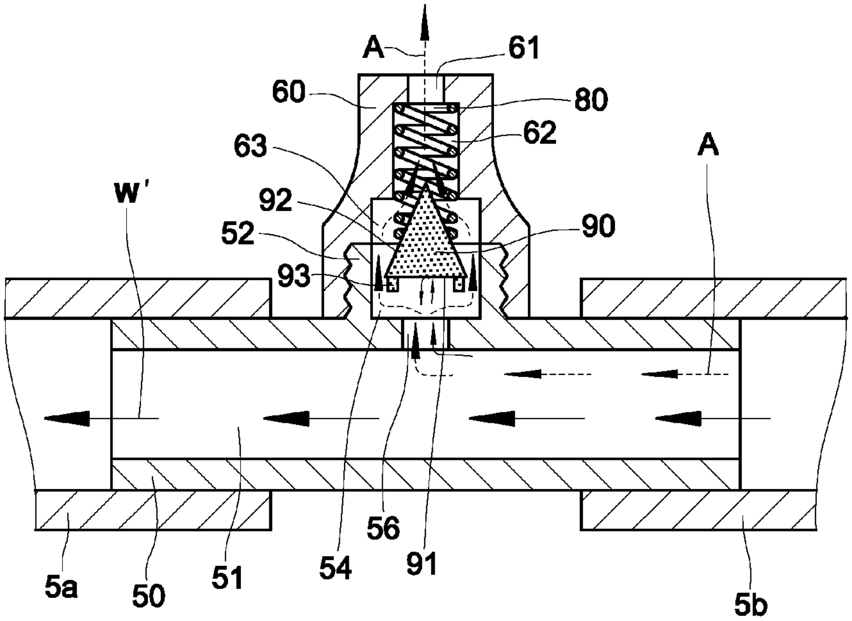
FIG. 14 is the second operational schematic view in cross section manner according to the first preferred embodiment of the present invention.
Figure 15:
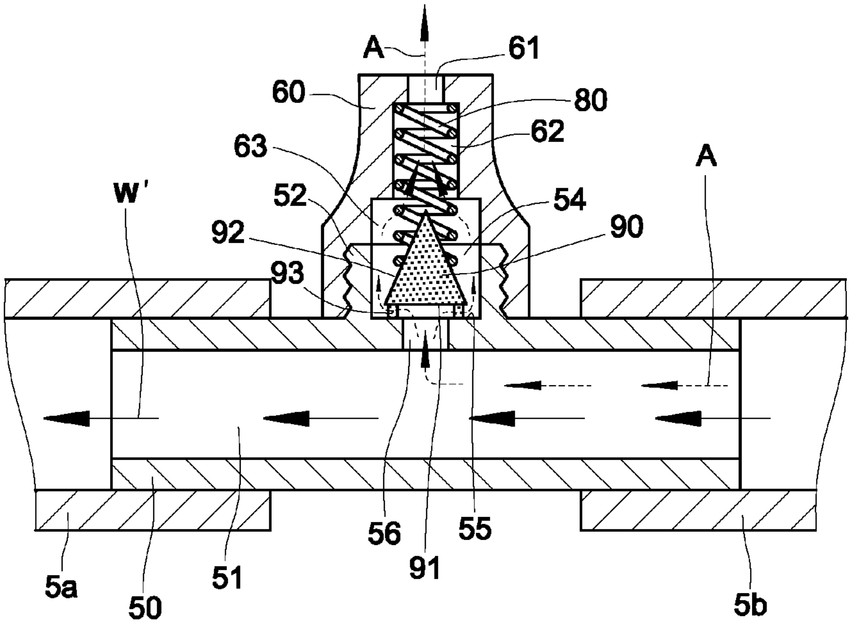
FIG. 15 is the third operational schematic view in cross section manner according to the first preferred embodiment of the present invention.
Figure 16:
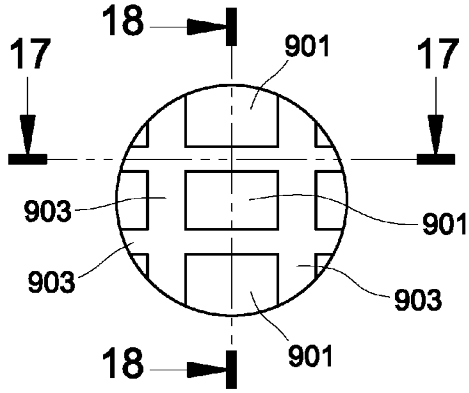
FIG. 16 is a bottom view showing a modified conical moving plug according to the first preferred embodiment of the present invention.
Figure 17:
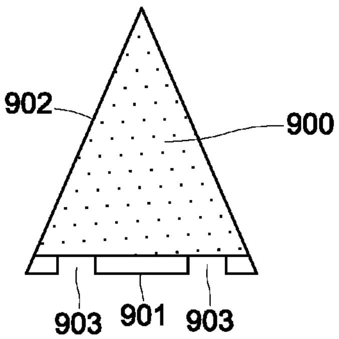
FIG. 17 is a sectional view taken along the line 17-17 of the FIG. 16.
Figure 18:
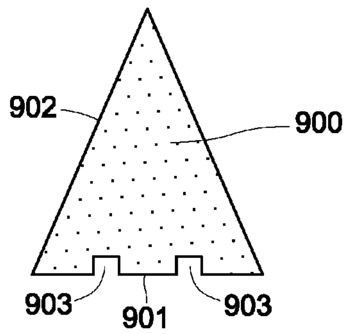
FIG. 18 is a sectional view taken along the line 18-18 of the FIG. 16.

In abnormal mode of certain air A mingled in the compressed water W', the pressure of the compressed water W' in the water outlet 12 of the diaphragm compression pump 10 is lower than the resilient force of the compression spring 80 so that the conical moving plug 90 is downwardly pushed by the resilient force of the compression spring 80 in overcoming the resultant water pressure of the compressed water W' mingled air A to have its top cone 92 detached off the upper side of solid ring at the intake chamber 63 while a water flow gap is created between the top cone 92 and the upper side of solid ring at the intake chamber 63. Thereby, the air A mingled in the compressed water W', which come from the water outlet 12 of the diaphragm compression pump 10 via the water outtake hose 5*b*, will firstly flow into the hollow discharge chamber 54 in the cylindrical discharging mount 52 via the air passage 56 at the cylinder bore 51 of the main body 50, then flow into the airflow passage 62 orderly via the top surface on the top cone 92 of the conical moving plug 90 and plural gaps among coils of the compression spring 80, and finally discharge out of the external hood jacket 60 via the discharging vent 61 to achieve the air-discharging effect (as shown in FIG. 14 and direction indicated by each hypothetical arrowhead shown in FIG. 14). The pressure of the compressed water W' in the water outlet 12 of the diaphragm compression pump 10 will resume to be higher than the resilient force of the compression spring 80 after all the air A mingled therein has been discharged out of the external hood jacket 60 so that the conical moving plug 90 is again upwardly pushed by the compressed water W' in overcoming the resilient force of the compression spring 80 to have its top cone 92 thoroughly plunged into the airflow passage 62 of the external hood jacket 60 and hermetically attached on the upper side of solid ring at the intake chamber 63 in water tight manner; Thus, the diaphragm compression pump 10 and the portable pressurized sprayer 1 resume to normal operation (as shown in FIG. 13).

Before start of the diaphragm compression pump 10, a water flow gap with height equivalent to height of the footing leg 93 is created between the planar base 91 of the conical moving plug 90 and the air passage 56 at the cylinder bore 51 of the main body 50 because the conical moving plug 90 is acted by the resilience of the compression spring 80 (as shown in FIG. 12). At this moment, if the diaphragm compression pump 10 is started under the status that certain air A mingled in the compressed water W' with result in overall water pressure being less than the resilience of the compression spring 80, the "air discharge implement for a portable pressurized sprayer" of the present invention still has air-discharging effect because the air A mingled in the compressed water W' can firstly flow into the hollow discharge chamber 54 via the water flow gap between the planar base 91 of the conical moving plug 90 and the air passage 56 at the cylinder bore 51, then flow into the airflow passage 62 orderly via the top surface on the top cone 92 of the conical moving plug 90 and plural gaps among coils of the compression spring 80, and finally discharge the air A out of the external hood jacket 60 via the discharging vent 61 to achieve the air-discharging effect (as direction indicated by each hypothetical arrowhead shown in FIG. 15). Therefore, either no air A or certain air A mingled in the compressed water W', the "air discharge implement for a portable pressurized sprayer" of the present invention can achieve the complete air-discharging effect.

Figure 19:
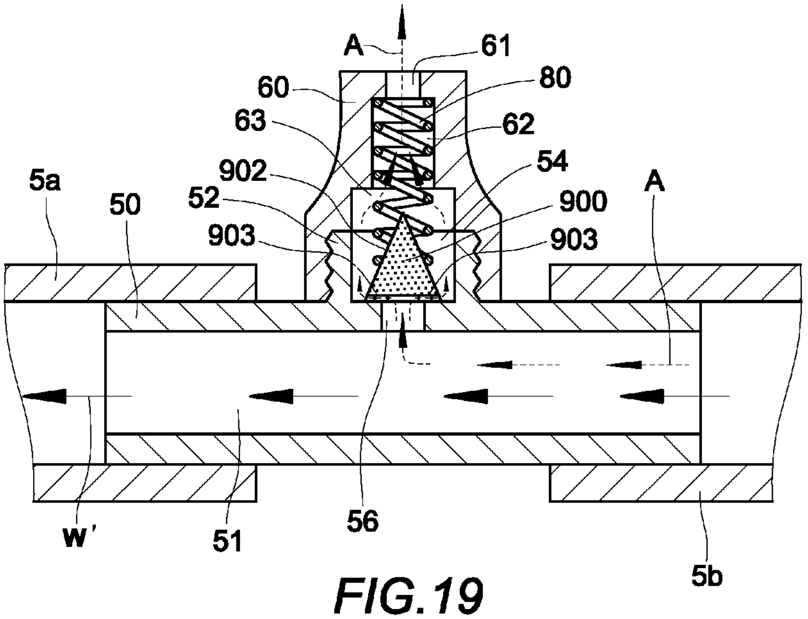
FIG. 19 is the first operational schematic view in cross section manner showing a modified conical moving plug according to the first preferred embodiment of the present invention.
Figure 20:
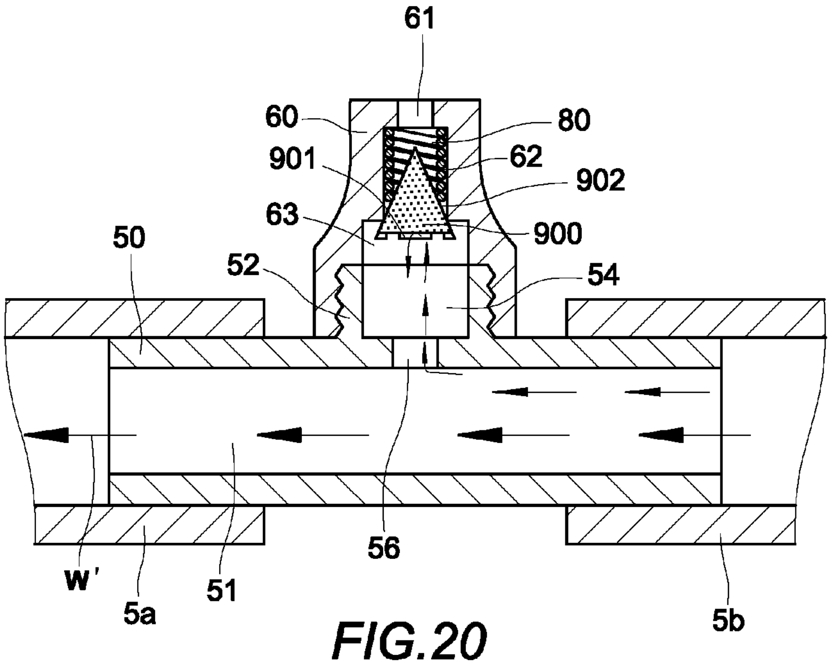
FIG. 20 is the second operational schematic view in cross section manner showing a modified conical moving plug according to the first preferred embodiment of the present invention.

Please refer to FIGS. 16 through 20, which show a modified conical moving plug 900 for the second exemplary preferred embodiment of the present invention, wherein the conical moving plug 900 here includes a top cone 902 and a planar base 901 with plural grooves 903 of intercrossed arrangement. If certain air A mingled in the compressed water W', the air A mingled in the compressed water W', will firstly flow into the hollow discharge chamber 54 via the grooves 903 at the planar base 901, then flow into the airflow passage 62 orderly via the top surface on the top cone 902 of the conical moving plug 900 and plural gaps among coils of the compression spring 80, and finally discharge the air A out of the external hood jacket 60 via the discharging vent 61 to achieve the air-discharging effect (as shown in FIG. 19). The pressure of the compressed water W' in the water outlet 12 of the diaphragm compression pump 10 will resume to be higher than the resilient force of the compression spring 80 after all the air A mingled therein has been discharged out of the external hood jacket 60 so that the conical moving plug 900 is again upwardly pushed by the compressed water W' in overcoming the resilient force of the compression spring 80 to have its top cone 902 thoroughly plunged into the airflow passage 62 of the external hood jacket 60 and hermetically attached on the upper side of solid ring at the intake chamber 63 in water tight manner; Thus, the diaphragm compression pump 10 and the portable pressurized sprayer 1 resume to normal operation (as shown in FIG. 20).

Figure 21:
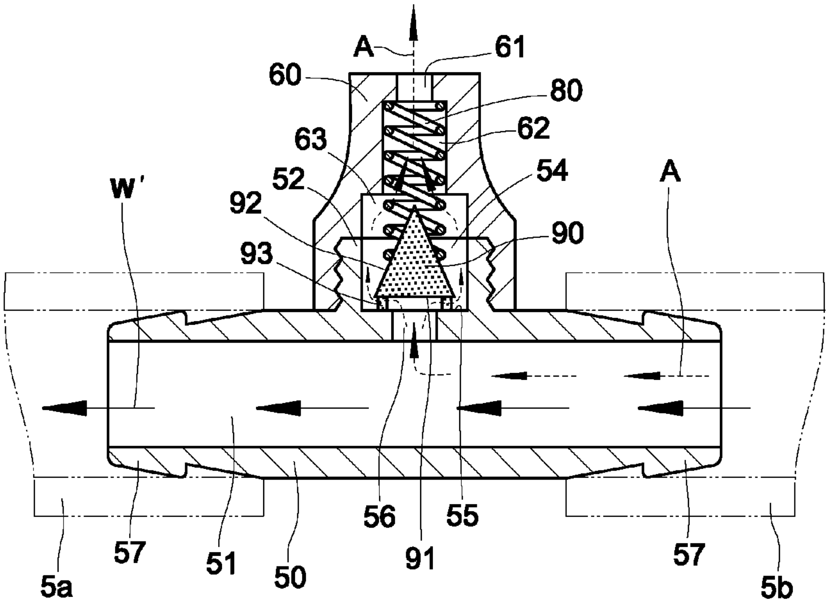
FIG. 21 is a sectional schematic view showing a modified cylindrical main body according to the first preferred embodiment of the present invention.

Please refer to FIG. 21, which shows a modified cylindrical main body 50 for the third exemplary preferred embodiment of the present invention, wherein each end peripheral on the cylindrical main body 50 is modified into plural chamfered ridges 57 with each slight fluke in continuously parallel arrangement such that the major diameter of the chamfered ridges 57 approximately equals the bore of the water outtake hose 5*a* and 5*b*; Thereby, when each of water outtake hose 5*a* and 5*b* sleeves over each corresponding end peripheral on the cylindrical main body 50, the chamfered ridges 57 can enhance the engaging effect to achieve firm mating and secure coupling function without any possibility of detachment.

Figure 22:
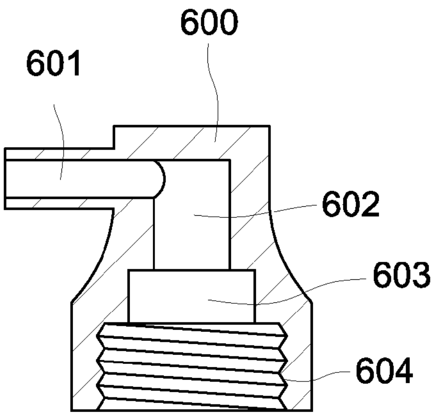
FIG. 22 is a sectional schematic view showing a modified external hood jacket according to the first preferred embodiment of the present invention.
Figure 23:
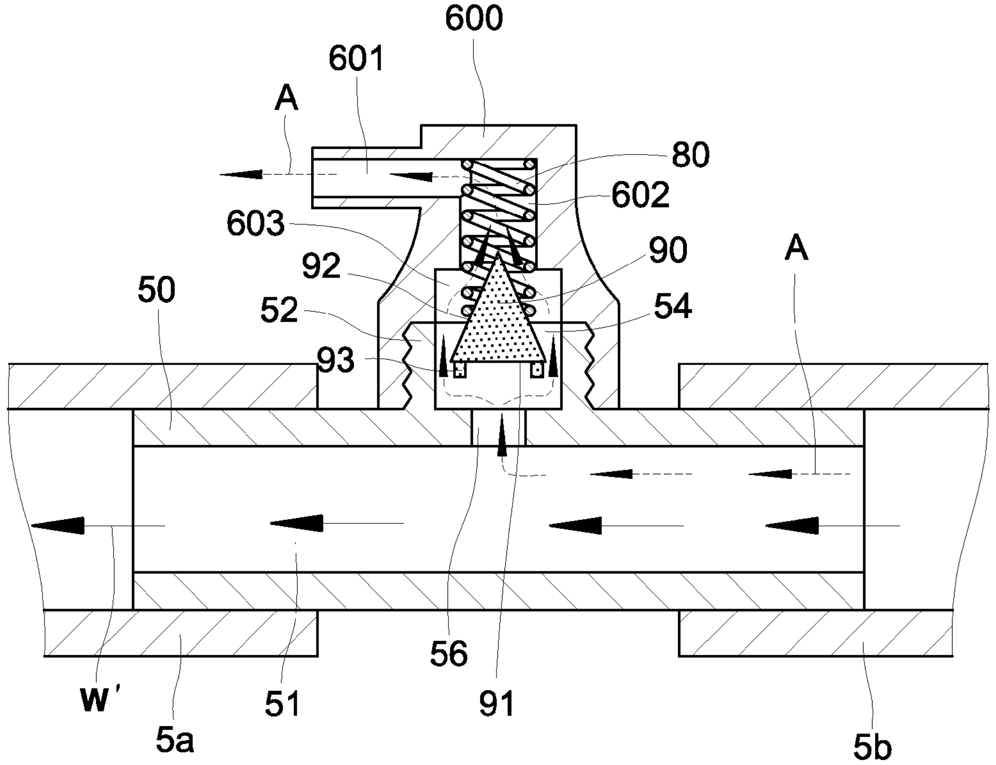
FIG. 23 is an operational schematic view showing a modified external hood jacket according to the first preferred embodiment of the present invention.

Please refer to FIGS. 22 and 23, which show a modified external hood jacket 600 for the fourth exemplary preferred embodiment of the present invention, wherein the external hood jacket 600 here includes a protruding orthogonal discharging vent 601 disposed at the top peripheral thereof such that both of said protruding orthogonal discharging vent 601 and airflow passage 602 are orthogonal mutually and water communicable each other. Thereby, the air A mingled in the compressed water W' can be detoured via the protruding orthogonal discharging vent 601 (as shown in FIG. 23) instead of directly impacting on other parts in a portable pressurized sprayer as usual ways aforesaid.

Figure 24:
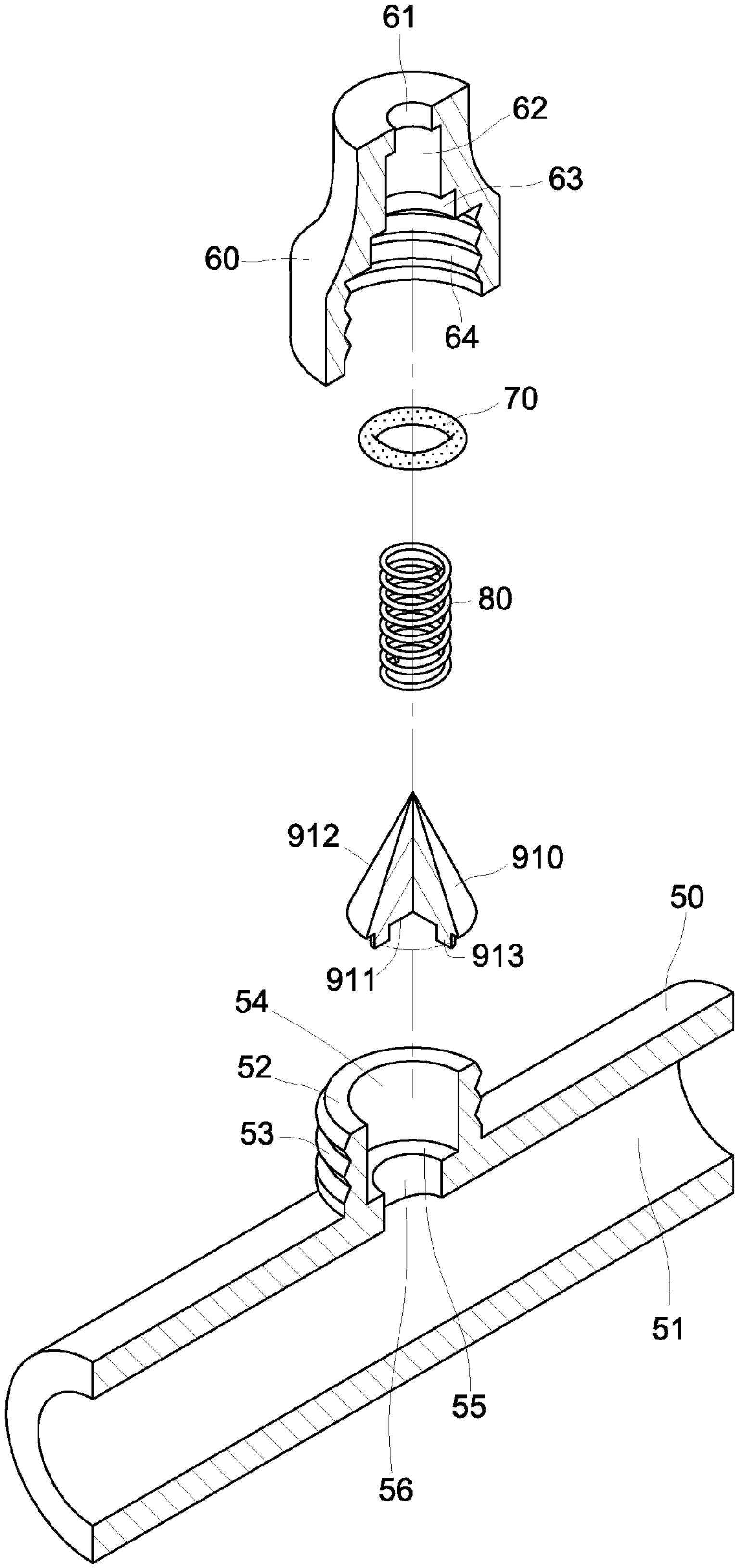
FIG. 24 is an exploded perspective schematic view showing an altered conical moving plug and an additional annular washer according to the second preferred embodiment of the present invention.
Figure 25:
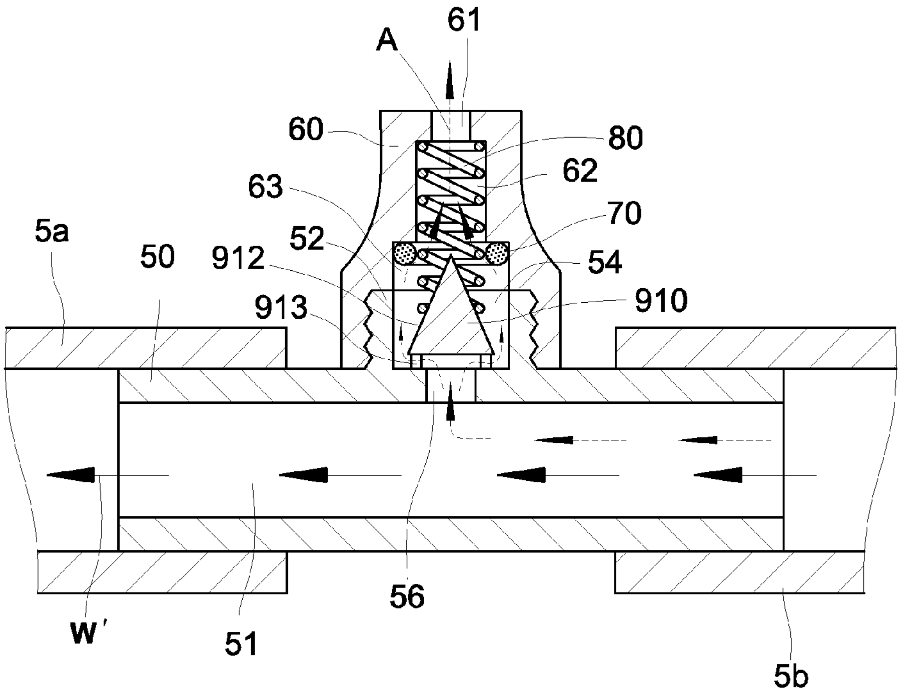
FIG. 25 is the first operational schematic view showing an altered conical moving plug and an additional annular washer according to the second preferred embodiment of the present invention.
Figure 26:
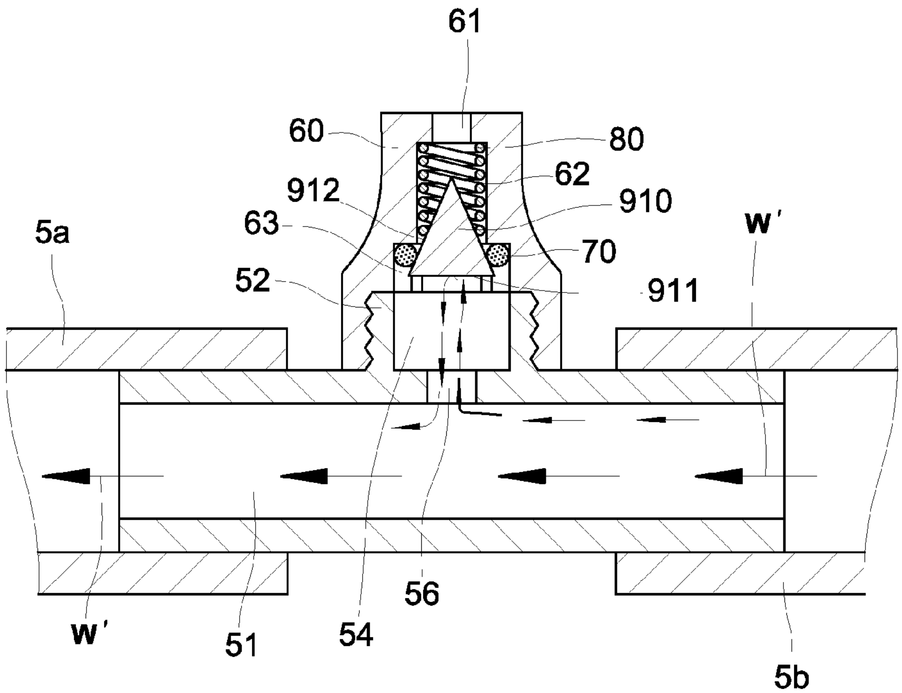
FIG. 26 is the second operational schematic view showing an altered conical moving plug and an additional annular washer according to the second preferred embodiment of the present invention.

Please refer to FIGS. 24 through 26, which show an altered conical moving plug 910 and an additional annular washer 70 in the intake chamber 63 of the external hood jacket 60 for the fifth exemplary preferred embodiment of the present invention, wherein the conical moving plug 910 is made of rigid plastic material by unitary injection molding method while the annular washer 70 is made by elastic rubber material such that bore of the annular washer 70 is bigger than outer diameter of the compression spring 80 while the outer diameter of the annular washer 70 is slightly bigger than bore of the intake chamber 63 so as to have interference fit engagement between corresponding mating annular washer 70 and intake chamber 63 without possibility of detaching off. If certain air A mingled in the compressed water W', the air A mingled in the compressed water W', will firstly flow into the hollow discharge chamber 54 via the water flow gaps among footing legs 913 under a planar base 911 of the conical moving plug 910, then flow into the airflow passage 62 orderly via top surface on a top cone 912 of the conical moving plug 910 and plural gaps among coils of the compression spring 80, and finally discharge the air A out of the external hood jacket 60 via the discharging vent 61 to achieve the air-discharging effect (as shown in FIG. 25). The pressure of the compressed water W' in the water outlet 12 of the diaphragm compression pump 10 will resume to be higher than the resilient force of the compression spring 80 after all the air A mingled therein has been discharged out of the external hood jacket 60 so that the conical moving plug 910 is again upwardly pushed by the compressed water W' in overcoming the resilient force of the compression spring 80 to have its top cone 912 together with the annular washer 70 thoroughly plunged into the airflow passage 62 of the external hood jacket 60 and hermetically attached on the upper side of solid ring at the intake chamber 63 in water tight manner; Thus, the diaphragm compression pump 10 and the portable pressurized sprayer 1 resume to normal operation (as shown in FIG. 26).

Figure 27:
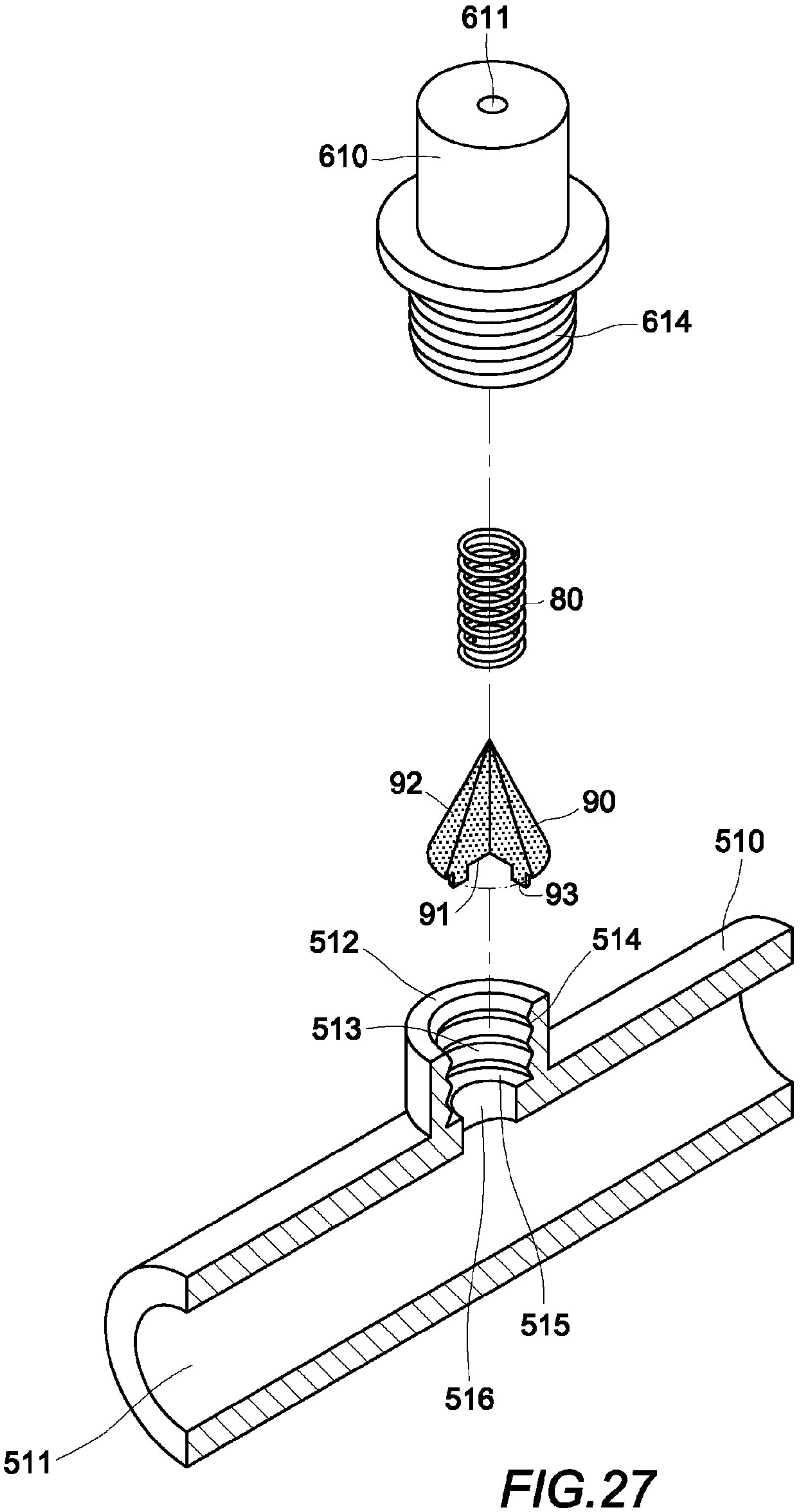
FIG. 27 is an exploded perspective schematic view showing an adapted external hood jacket and an adapted cylindrical main body according to the third preferred embodiment of the present invention.
Figure 28:
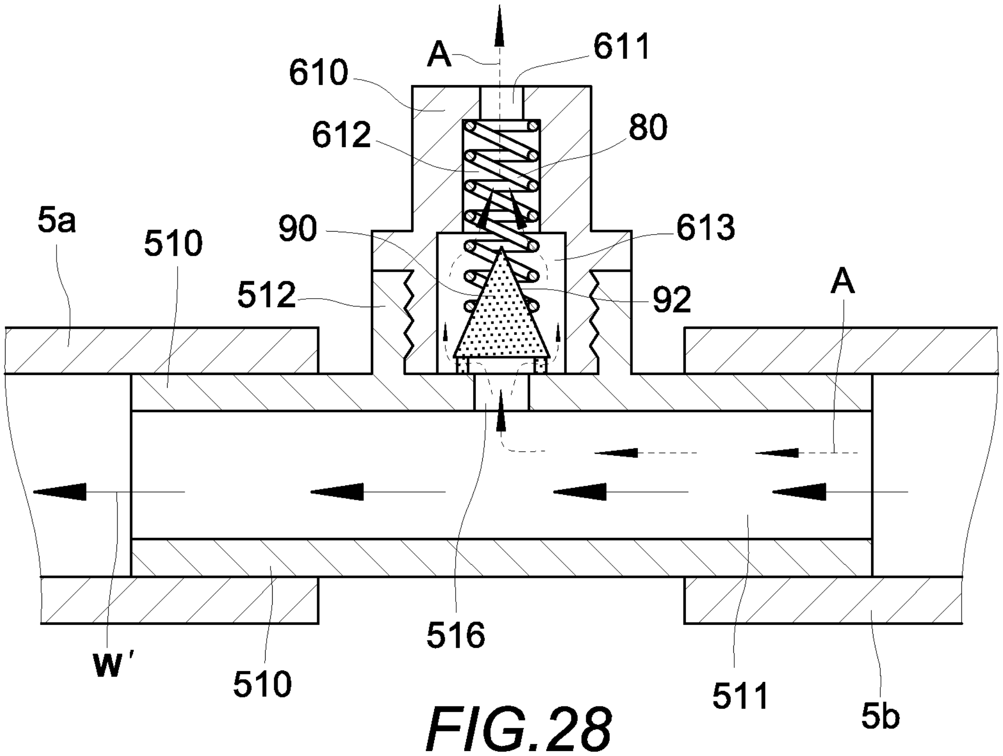
FIG. 28 is the first operational schematic view showing an adapted external hood jacket and an adapted cylindrical main body according to the third preferred embodiment of the present invention.
Figure 29:
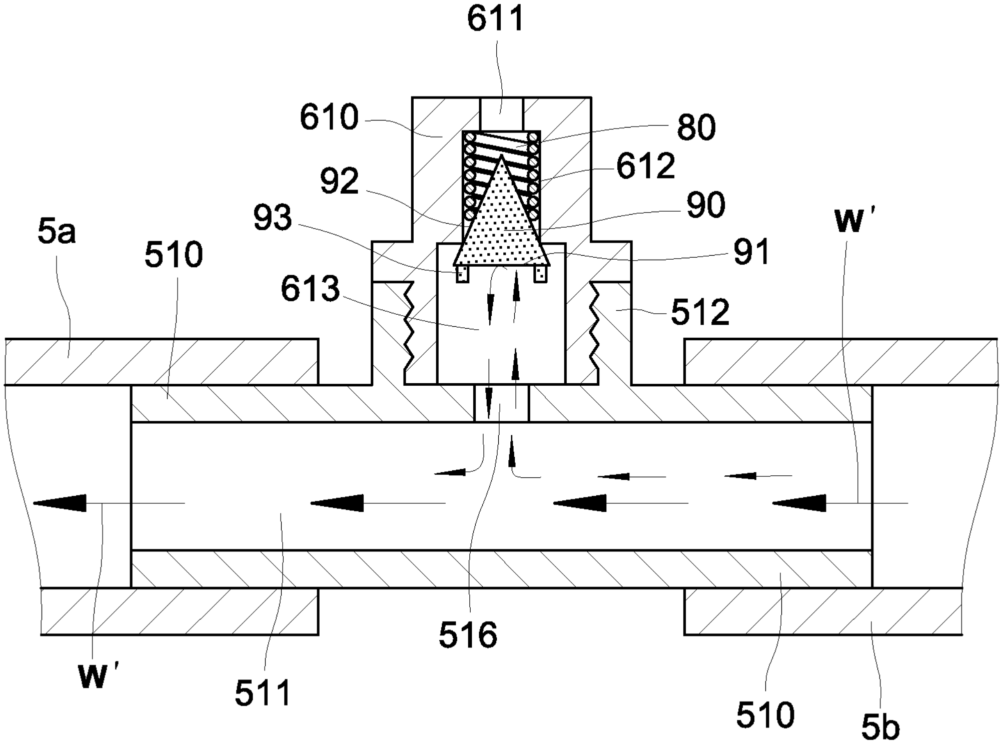
FIG. 29 is the second operational schematic view showing an adapted external hood jacket and an adapted cylindrical main body according to the third preferred embodiment of the present invention.

Please further refer to FIGS. 27 through 29, which show an adapted external hood jacket 610 and an adapted cylindrical main body 510 for the sixth exemplary preferred embodiment of the present invention, wherein said external hood jacket 610 here orderly includes a discharging vent 611, an airflow passage 612 and a hollow discharge chamber 613 and a male external thread 614 created on lower section peripheral thereof from top to bottom in the central inner portion thereof such that the discharging vent 611 and airflow passage 612 as well as the airflow passage 612 and hollow discharge chamber 613 are mutually fluid communicable respectively, and bore of the hollow discharge chamber 613 is bigger than that of the airflow passage 612 for containing the conical moving plug 90 therein while bore of the airflow passage 612 is bigger than that of the discharging vent 611; and said cylindrical main body 510 here orderly includes a cylindrical discharging mount 512 and a intake chamber 513 with a female internal thread 514 created therein for screw mating with corresponding male external thread 614 on the external hood jacket 610. The operation of air-discharging way is shown in FIGS. 28 and 29. If certain air A mingled in the compressed water W', the air A mingled in the compressed water W', will firstly flow into the hollow discharge chamber 613 of the external hood jacket 610 via the water flow gaps among footing legs 93 under a planar base 91 of the conical moving plug 90, then flow into the airflow passage 612 orderly via top surface on a top cone 92 of the conical moving plug 90 and plural gaps among coils of the compression spring 80, and finally discharge the air A out of the external hood jacket 610 via the discharging vent 611 to achieve the air-discharging effect (as shown in FIG. 28). The pressure of the compressed water W' in the water outlet 12 of the diaphragm compression pump 10 will resume to be higher than the resilient force of the compression spring 80 after all the air A mingled therein has been discharged out of the external hood jacket 610 so that the conical moving plug 90 is again upwardly pushed by the compressed water W' in overcoming the resilient force of the compression spring 80 to have its top cone 92 thoroughly plunged into the airflow passage 612 of the external hood jacket 610 and hermetically blocked the hollow discharge chamber 613 in water tight manner; Thus, the diaphragm compression pump 10 and the portable pressurized sprayer 1 resume to normal operation (as shown in FIG. 29).

In conclusion of disclosures heretofore, by means of a simple contrived structure, the "air discharge implement for a portable pressurized sprayer" of the present invention completely solves and obviates the air-discharging issue existed in conventional portable pressurized sprayer due to air mingled in the compressed water that it really has industrial practical usage and meet the criteria of patentability.

What is claimed is:

1. An air discharge implement for a portable pressurized sprayer comprising:

a main body;

an external hood jacket;

a conical moving plug; and a compression spring, wherein said main body is a hollow tube that includes a cylinder bore, and a cylindrical discharging mount, said discharging mount including a central internal hollow discharge chamber and an air passage interposed between said hollow discharge chamber and said cylinder bore;

wherein said external hood jacket is an inverted hollow bucket-shaped holder secured to said cylindrical discharging mount of said main body and that includes a discharging vent, an airflow passage, and an intake chamber such that said discharging vent and airflow passage as well as said airflow passage and an intake chamber are in respective fluid communication, and a diameter of said intake chamber is bigger than that of said airflow passage while a diameter of said airflow passage is bigger than that of said discharging vent;

wherein said conical moving plug is movably situated in said hollow discharge chamber of said main body and includes a top cone and a planar base with one of a plurality of footing legs extending from the base or a plurality of grooves; and wherein said compression spring is positioned in said airflow passage of said external hood jacket such that a bottom of the compression spring contacts said top cone of said conical moving plug, an inner diameter of said compression spring being less than an outer diameter of said top cone such that said compression spring presses said planar base of said conical moving plug against said hollow tube, whereby, when said planar base of said conical moving plug is pressed against said hollow tube, air in said cylindrical bore of the hollow tube passes into said hollow discharge chamber of the cylindrical discharging mount by passing through said air passage and between said plural footing legs or through said plurality of grooves, said air passing from the hollow discharge chamber through the intake chamber, air flow passage, and discharging vent of the external hood jacket, whereby as pressure of water flowing through said cylindrical bore of the hollow discharge chamber increases, said conical moving plug is moved away from the hollow tube to permit additional air to flow through said air passage and into said hollow discharge chamber and from the hollow discharge chamber through said intake chamber, air flow passage, and discharging vent, and whereby when said pressure of water flowing through said cylindrical bore of the hollow discharge chamber increases still further, said conical moving plug seals said air flow passage between said hollow discharge chamber and said air flow passage of said external hood jacket.

2. An air discharge implement for a portable pressurized sprayer as claimed in claim 1, wherein said planar based includes said plurality of footing legs.

3. An air discharge implement for a portable pressurized sprayer as claimed in claim 1, wherein said planar base includes said plurality of grooves.

4. An air discharge implement for a portable pressurized sprayer as claimed in claim 1, wherein said discharging vent is a protruding orthogonal discharging vent disposed at a top side of said external hood jacket such that said protruding orthogonal discharging vent and said airflow passage are mutually orthogonal and in fluid communication with each other.

5. An air discharge implement for a portable pressurized sprayer as claimed in claim 1, wherein said conical moving plug is made of a soft elastic material.

6. An air discharge implement for a portable pressurized sprayer as claimed in claim 1, wherein an additional annular washer is further disposed in the intake chamber of the external hood jacket, said conical moving plug being made of rigid plastic material while the annular washer is made of an elastic rubber material such that a bore of said annular washer is bigger than an outer diameter of said compression spring and an outer diameter of said annular washer is slightly bigger than a diameter of said intake chamber.

7. An air discharge implement for a portable pressurized sprayer as claimed in claim 1, wherein said external hood jacket is made of an injection molded material.

8. An air discharge implement for a portable pressurized sprayer as claimed in claim 1, wherein said external hood jacket includes a female internal thread in a lower section and said cylindrical discharging mount includes a male external thread in a periphery of the discharging mount, said external hood jacket being threaded onto the discharging mount.

9. An air discharge implement for a portable pressurized sprayer as claimed in claim 1, wherein said external hood jacket includes a male external thread on a lower section; and said cylindrical discharging mount includes a female internal thread into which said external male thread of said external hood jacket is threaded.

* * * * *